United States Patent [19]
Gyugyi et al.

[11] 3,818,315
[45] June 18, 1974

[54] ELECTRICAL CONVERTER APPARATUS HAVING AN INTEGRATING TYPE CONTROL MEANS FOR DETERMINING FIRING POINTS AND AN END STOP FIRING PULSE CONTROL MEANS

[75] Inventors: Laszlo Gyugyi, Pittsburgh; Brian R. Pelly, Murrysville; Eric J. Stacey, Pittsburgh, all of Pa.

[73] Assignee: Westinghouse Electric Corporation, Pittsburgh, Pa.

[22] Filed: Nov. 22, 1972

[21] Appl. No.: 308,894

[52] U.S. Cl. .................................. 321/69 R, 321/7
[51] Int. Cl. ............................................. H02m 5/30
[58] Field of Search ........... 321/5, 7, 38, 40, 60, 61, 321/65, 66, 69 R

[56] References Cited
UNITED STATES PATENTS
3,713,012  1/1973  Johnson ............................. 321/5 X

OTHER PUBLICATIONS

Pelly, Thyristor Phase–Controlled Converters and Cycloconverters, Wiley–Interscience, 1971, pg. 260, TK7872.C8.

Primary Examiner—A. D. Pellinen
Attorney, Agent, or Firm—G. H. Telfer

[57] ABSTRACT

In order to prevent reference voltage variations from producing system malfunctions in converters having an integrating type firing pulse control system, an overriding end stop firing pulse control is provided that introduces pulses at prescribed intervals in positive and negative directions to the firing circuits to limit the maximum period within which firing can occur.

5 Claims, 13 Drawing Figures

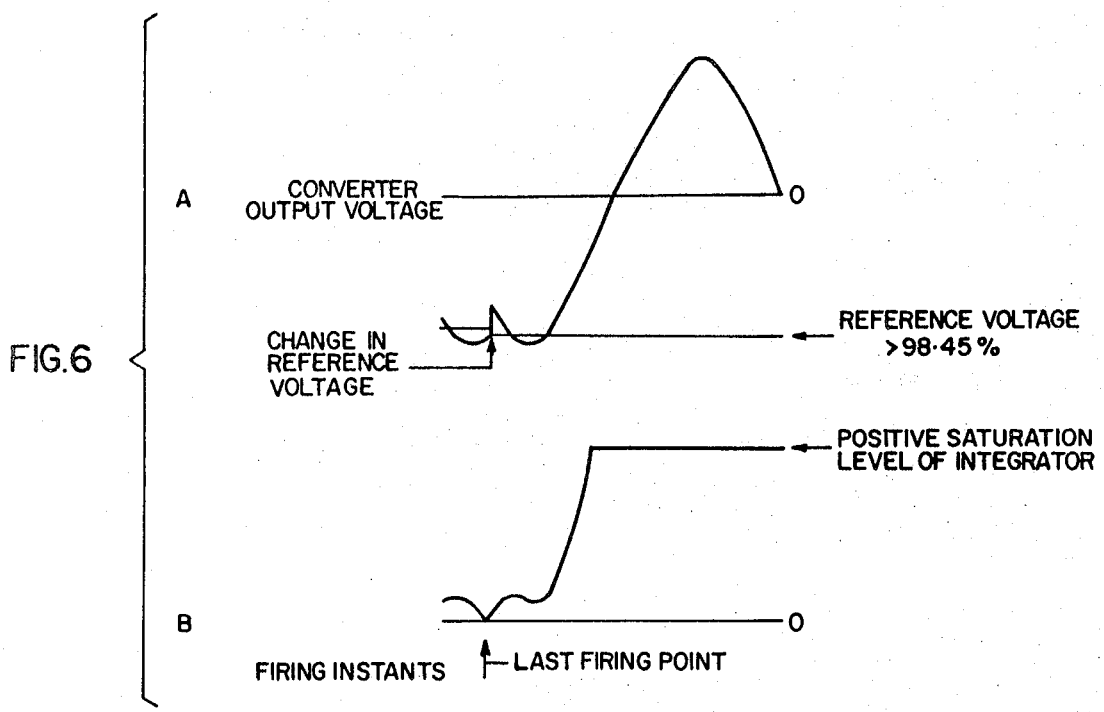
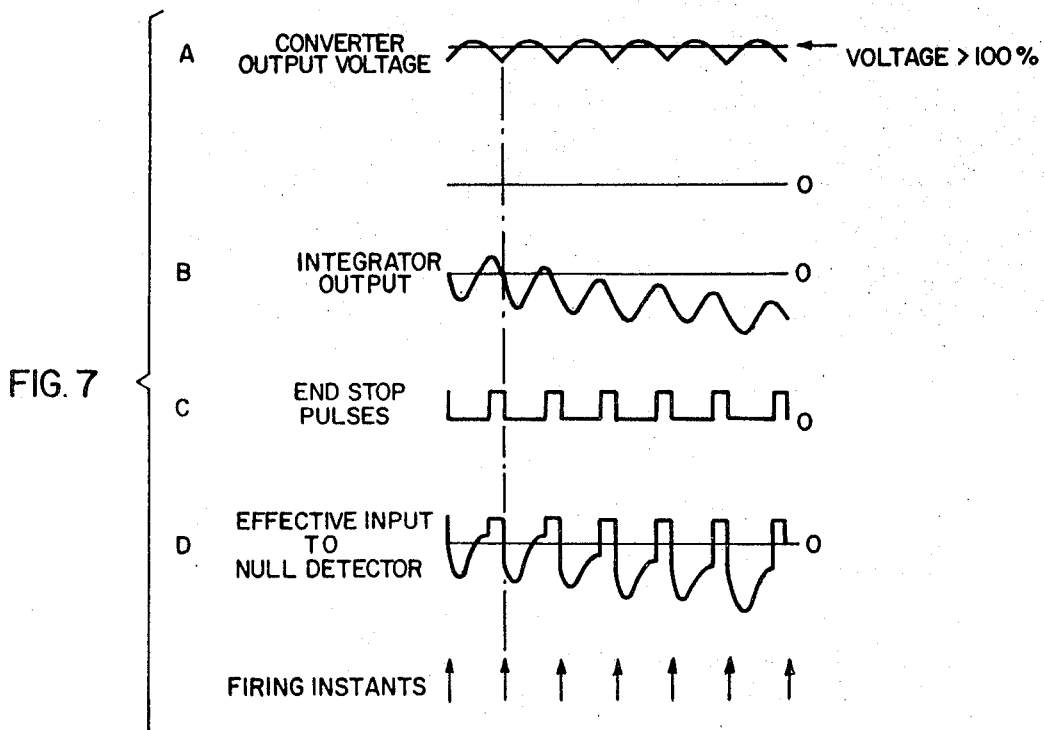

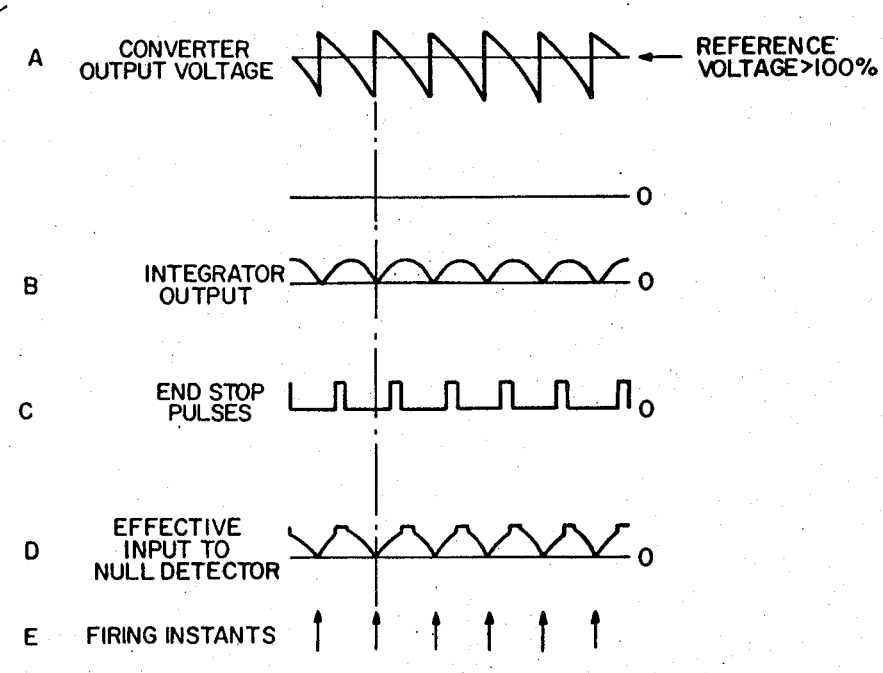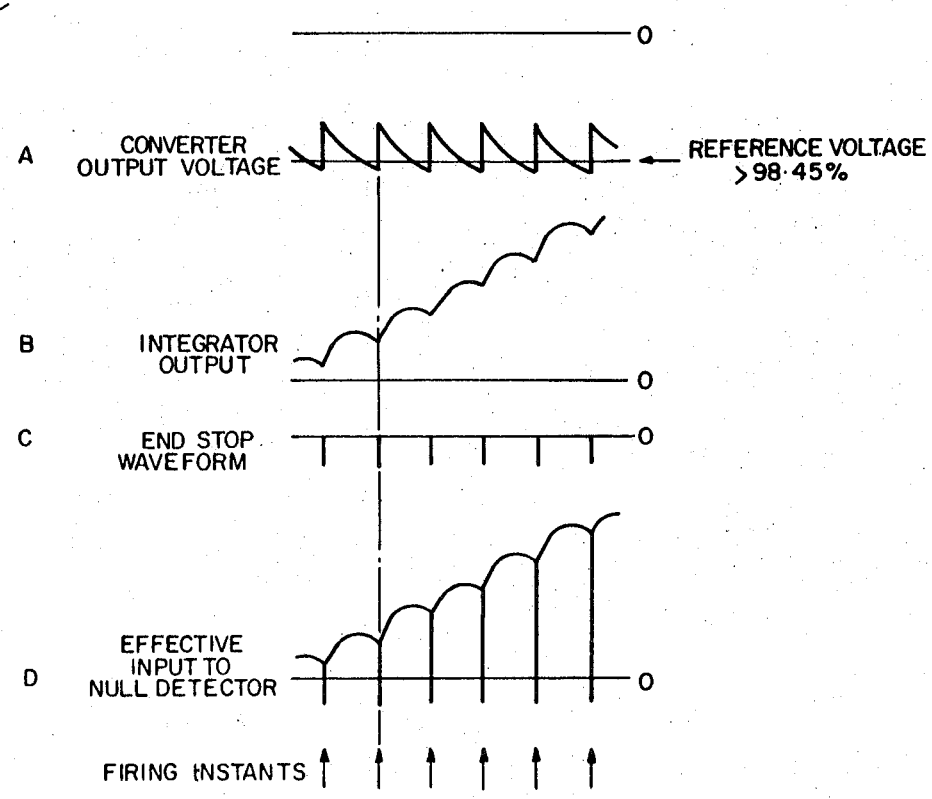

ELECTRICAL CONVERTER APPARATUS HAVING AN INTEGRATING TYPE CONTROL MEANS FOR DETERMINING FIRING POINTS AND AN END STOP FIRING PULSE CONTROL MEANS

BACKGROUND OF THE INVENTION

The invention relates to electrical converter apparatus for producing a.c. power at a desired frequency (including zero frequency) from a source of a.c. power of a different or varying frequency). In particular the invention relates to thyristor phase controlled converters and cycloconverters.

An integrating type of control of firing pulses in converters (including cycloconverters) has been found to be advantageous. This type of control system compares integrated values of the reference voltage and the cycloconverter output in determining appropriate firing points. Such control schemes are described in Thyristor Phase-Controlled Converters and Cycloconverters by B. R. Pelly, published 1971 by John Wiley and Sons Inc., pp. 242–245, and in U.S. Pat. No. 3,585,485 and 3,385,486, both issued June 15, 1971, by L. Gyugyi, J. Rosa and B. R. Pelly and by L. Gyugyi and B. R. Pelly, respectively.

It has been recognized that in phase controlled converters and cycloconverters it is desirable to have what is referred to as "end stop control." The reason for this is that the means generating the normally occurring firing pulses may, under some conditions, produce pulses with firing angles which lie outside the range of 0° to 180° required for operation of the switching devices (i.e., thyristors) in the power converter. Various methods of deriving end stop pulses are described in the above mentioned book by B. R. Pelly on pages 259 and 271. The scheme to utilize end stop pulses in the control is presented there for illustrative purposes and is not preferred for use in practical systems with integral control of firing pulses. Integral control firing pulse schemes present characteristics not amenable to end stop control by previously used techniques because of peculiarities resulting from variations in the reference voltage as will be subsequently discussed in greater detail.

It was in an effort to provide a suitable end stop control for systems having an integrating control firing pulse generation that the present invention came about.

SUMMARY OF THE INVENTION

In order to prevent reference voltage variations from producing system malfunctions in converters having an integrating type firing pulse control means, an overriding end stop firing pulse control is provided by this invention that introduces pulses at prescribed intervals, in both positive and negative directions, to the firing circuits to limit the maximum period within which firing can occur. Briefly, end stop pulses, developed independently of the reference voltage, are introduced to the comparator normally present in integral control and such end stop pulses override the normally produced pulses when a reference voltage variation outside predetermined limits occurs.

THE DRAWING

FIGS. 3 to 6 are sets of waveforms illustrating the time relation of events under various operating conditions without end stop control;

FIGS. 7 to 9 are sets of waveforms showing the time relation of events when end stop control is practiced in accordance with the present invention;

DESCRIPTION OF OPERATING CHARACTERISTICS AND PREFERRED EMBODIMENTS

Before proceeding with a detailed description of the means and method for achieving end stop control in accordance with this invention, there will be described the circumstances requiring special treatment of end stop control in integral control firing pulse systems.

Figure 1:
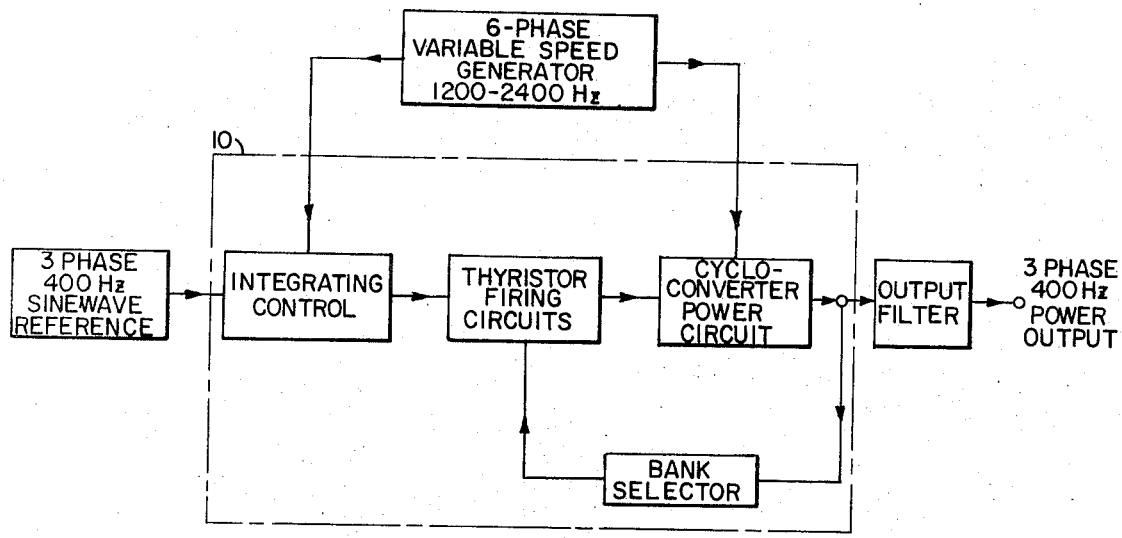
FIG. 1 is a schematic diagram of one phase of a cycloconverter system in which the present invention may be advantageously practiced.

Merely to set the environment for the advantageous practice of this invention, FIG. 1 shows a simplified block diagram of a cycloconverter system using integrating control in accordance with the above referred to patents. This type of system is sometimes characterized as a variable speed, constant frequency (or VSCF) cycloconverter system, and is particularly well suited to aircraft applications. The individual parts of the circuit of FIG. 1 will not be discussed in detail as they are well known in the art. The point to be made here is that the system essentially consists of a high power amplifier, including those elements enclosed by the dashed line 10, and the low level sinusoidal reference voltage waveform is reproduced, through the action of the integrating control and the cycloconverter power circuit, at the output terminals.

The diagram of FIG. 1 is of course merely exemplary. Generally, any number of output phases can be produced from the voltages of a multi-phase generator. The reference voltage may also be of another waveform or frequency of alternating voltage or direct voltage and the frequency range of the a.c. input voltage supplied from the generator may be of other than the characteristic frequency range indicated.

If the input reference voltage is increased to the point that the amplifying system 10 is taken near or into saturation, then the basic firing pulse control tends to produce pulses at points in time which would result in the malfunctioning of the power circuit. Under extreme conditions, it may be the case that no firing pulses at all are produced. These conditions cannot occur while the system is operating within the normal design limits, but they can occur unavoidably under abnormal transient conditions. For this reason, particularly applicable to integral control systems, it is therefore desirable to provide an end stop pulse control scheme, the function of which is to automatically take over the control of the firing pulses in the event that the integrating control is taken out of its normal operating range. The nature of the integrating control scheme, as opposed to other conventional systems, makes it necessary to consider a new end stop control principle.

For each thyristor within the converter there is a period of somewhat less than 180° during which that particular thyristor must be fired, within each cycle, in order to maintain correct operation of this system. So long as the relative reference voltage does not exceed the normal operating range, the integrated control always keeps the firing points within the required range of from 0° to slightly less than 180°. The basic function of the end stop control is to insure that if the integrating control fails to produce a firing pulse within the required range, a pulse will nevertheless be produced in that range which will maintain operation. That is, the invention provides a tolerable operating performance for periods that are transient. However, end stop control is needed in addition to the basic integral control and does not replace the integral control.

If the integrating control attempts to produce a pulse which occurs too early, the overriding end stop control prevents the initiation of the pulse until the "natural" commutation point, or until some other suitably chosen point thereafter. On the other hand, if the integrating control does not produce a pulse by the time of the "last point for safe commutation," the end stop control immediately initiates a pulse at that point.

Figure 2:
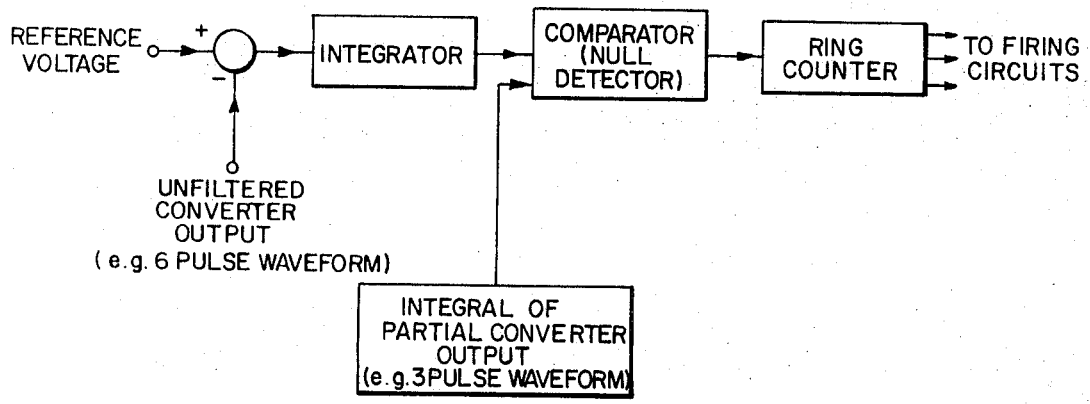
FIG. 2 is a schematic diagram of an integrating control subsystem of the system of FIG. 1 which will aid in understanding the problem solved by the present invention.

FIG. 2 illustrates a simplified schematic diagram of the basic integrating control scheme. The individual elements of FIG. 2 are described in greater detail in the above-mentioned patents. Characteristically, of course, the integrator comprises amplifier elements.

Figure 3:
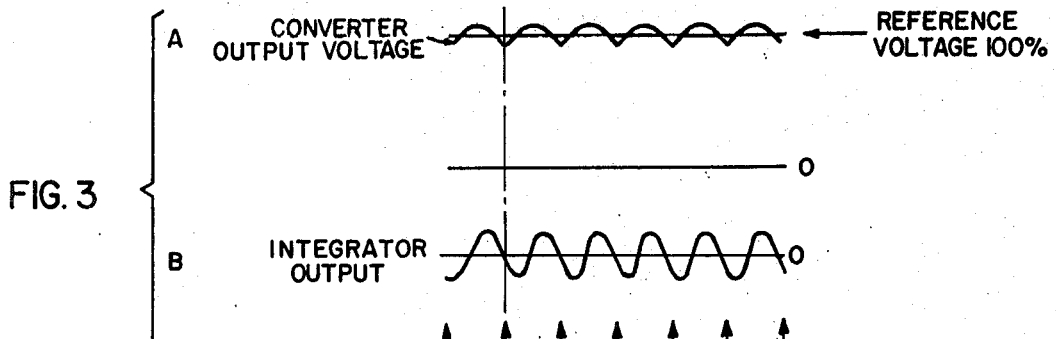

Consider first operation as performed while the reference voltage is of its desired value in the positive direction as shown in the waveforms of FIG. 3. In FIG. 3, it is assumed that the reference voltage is precisely 100 percent of its design positive value, here represented as a steady direct voltage although the reference voltage of systems of most interest is of time varying nature; however, the same principles apply. For purposes of the waveforms to be discussed herein it is also assumed that the commutation of current from one phase to the next takes place instantaneously. In FIG. 3, the relative reference voltage is exactly 100 percent, and the output of the integrating control produces firing pulses at a firing angle of exactly zero degrees, that is, the natural commutation point of the circuit. Waveform A illustrates the converter output voltage with a given reference voltage level while waveform B shows the integrator output for the same conditions. The firing instants occur at the zero points of the negative going integrator output as indicated by the arrows below waveform B.

Figure 4:
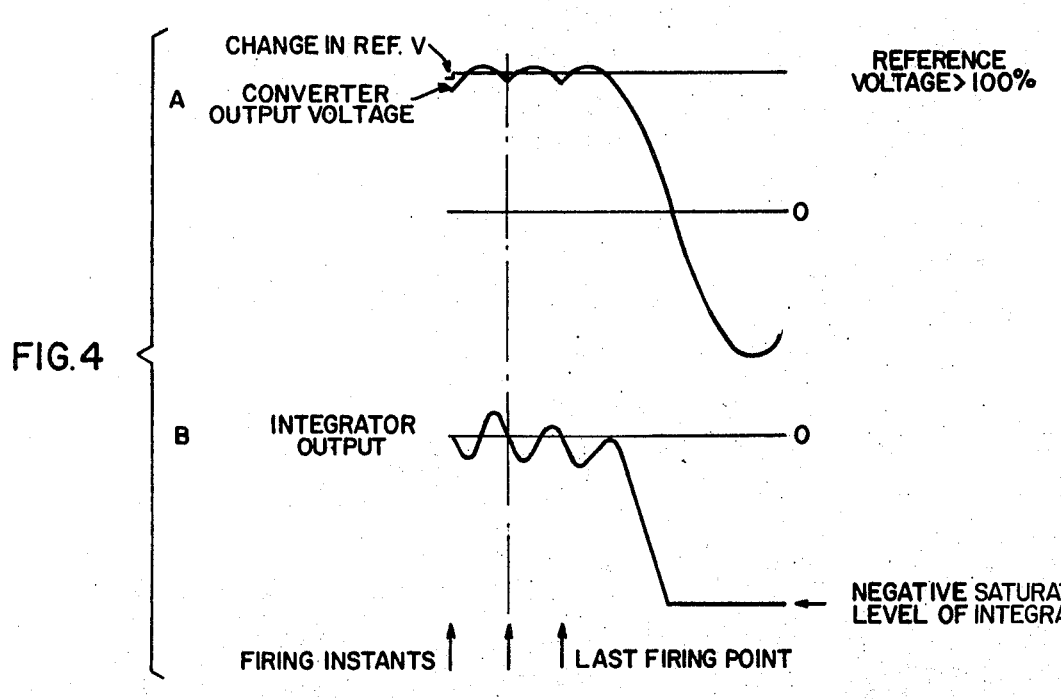

By way of contrast, FIG. 4 illustrates the occurrence of events when the reference voltage is greater than 100 percent of the positive design value as shown by the small step-wise increase in the reference voltage level in waveform A, without end stop control. The effect of the increase in the reference voltage level above the desired positive limit is initially to shift the firing point in advance of the natural commutation point. Assuming that the thyristor firing pulse is extended, the converter output voltage initially is not affected by the disturbance of reference voltage level. However, as each firing point becomes progressively more advanced, the integrator output, subject to the saturation effects of excess reference voltage, has decreasing peaks until it remains permanently in the negative direction and no further firing pulses are produced.

Consider now what happens when the reference voltage is increased beyond the limit value in the negative direction, without end stop control. It has been found, for a six pulse circuit, to be the case that the critical value of the negative reference voltage beyond which the integrating control cannot properly function is 98.45 percent of the positive limit value. This does not impose any practical restrictions on the system since it would actually be required to operate at a lower maximum reference voltage than the critical value in order to avoid commutation failures in the power circuit.

Figure 5:
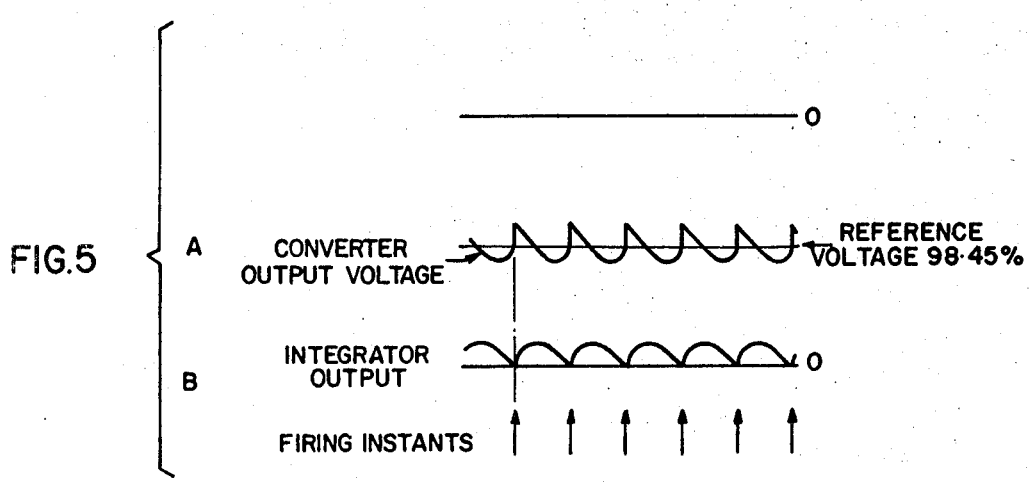

FIG. 5 illustrates the operation of the integrating control scheme with the reference voltage at its negative design limit. Here firing points are produced that occur in their proper sequence.

FIG. 6 shows a change in conditions that occurs if a small step increase is made in the negative reference voltage. It can be seen that the integrator output of waveform B of FIG. 6 remains permanently in the positive direction upon the change in reference voltage and no further firing points are produced.

A concept of the present invention is to provide a positive end stop pulse to pull the resultant voltage at the input of the null detector of the integrator in the positive direction. When this overriding pulse is removed the voltage at the null detector input will necessarily fall back into the negative direction. This provides an artificial voltage crossing point at the input of the null detector at the instant the end stop pulse is removed and a firing pulse is produced at this point the same way as if the crossing point had been naturally produced.

FIGS. 7 and 8 show conditions that occur with the practice of this invention for periods in which the reference voltage is of a positive value greater than 100 percent of its design limit and where the reference voltage is of a positive value that is less than 100 percent of its design limit. In FIG. 7, it can be seen that the trailing edge of the end stop pulses (waveform C) occur exactly at the natural commutation points of the system. The operating mechanism would be the same if the trailing edge of the end stop pulse is positioned at any selected point later than that shown.

In FIG. 8, where the reference voltage is of a positive value, less than 100 percent of its design limit, end stop control is not required. It can be seen in this case, that although the end stop pulse is present at the input of the crossover detector, it has no effect on the normal operation of the system.

FIG. 9 illustrates the conditions at the other extreme of the firing angle control range where the reference voltage is negative and greater than 98.45 percent of the design limit. In this region of the control range the output of the integrator is always positive prior to the production of a firing pulse and an artificial crossing point can be manufactured at any desired instant at the input of the null detector by the application of an overriding negative pulse as shown in waveform C of FIG. 9.

Figure 10:
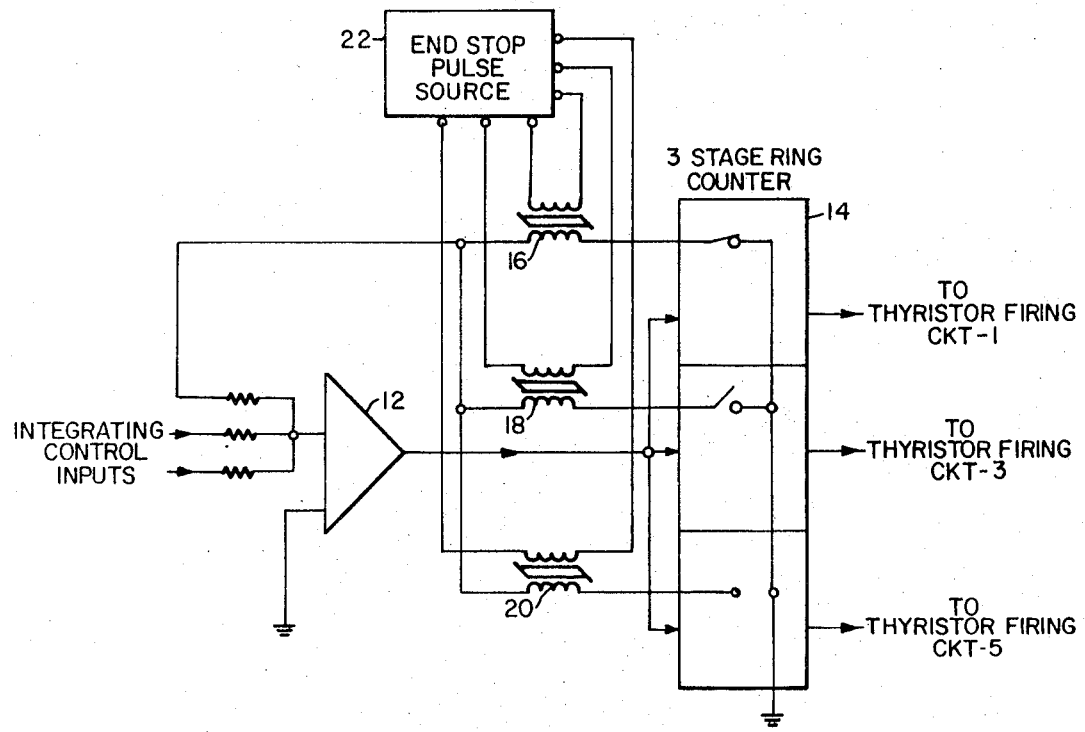
FIG. 10 is a schematic circuit diagram of an end stop control scheme in accordance with the present invention.

FIG. 10 illustrates an embodiment of the invention as applied to a three-pulse circuit. This circuit may be used by itself or it may be part of a higher pulse-number control system, such as one-half of a six pulse system. (It may be helpful to refer to above mentioned U.S. Pat. No. 3,585,485, particularly FIG. 7 and its related description as well as to FIG. 2 of this application.) A comparator or null detector 12 and three stage ring counter 14 are a part of the normal integrating control system. Additional components required for the practice of the present invention are the transformers 16, 18 and 20 individually connected in the lines to each stage of the ring counter. The primary windings of the transformers have signals applied to them by an end stop pulse source 22 in accordance with this invention to induce mutually phase displaced end stop waveforms in the transformer secondaries. The induced pulses are fed to the null detector 12 as an additional input.

Figure 11:
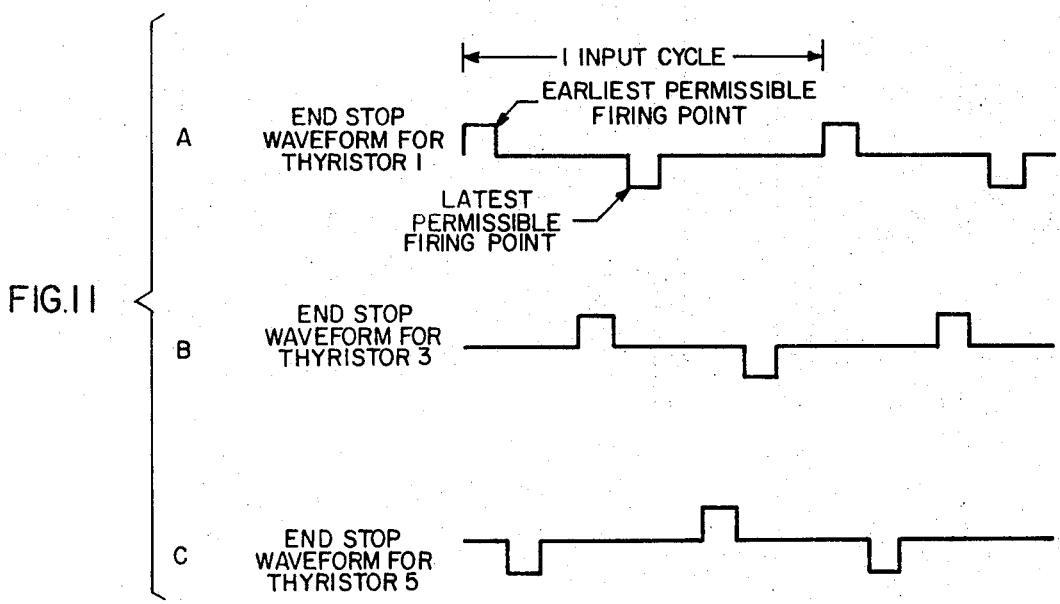
FIG. 11 is a set of waveforms illustrating the occurrence of end stop pulses in a system in accordance with this invention as illustrated in FIG. 10.

FIG. 11 illustrates suitable end stop waveforms that may be applied in the circuit of FIG. 10. The trailing edge of the positive pulse of each end stop waveform occurs at the selected "earliest point for commutation" and the leading edge of the negative pulse occurs at the "last safe point for commutation" for the associated thyristor.

From FIG. 10 it can be seen that when thyristor circuit 1 is on, the right-hand end of transformer winding 16 is connected to ground and hence the end stop waveform associated with thyristor circuit 3 is held in readiness at the input of the null detector 12. In the event that the normal integrating control would attempt to make a premature commutation, from thyristor 1 to thyristor 3, the presence of the overriding positive end stop pulse at the input of the null detector would prevent this. If thyristor 1 is still in conduction at the designated last point for commutation, the overriding negative end stop pulse would immediately effect the commutation from one to three. However, if the integrating control produces the pulse at any point within the two extremities then the end stop control does not produce a pulse and it has no effect upon normal operation.

Figure 12:
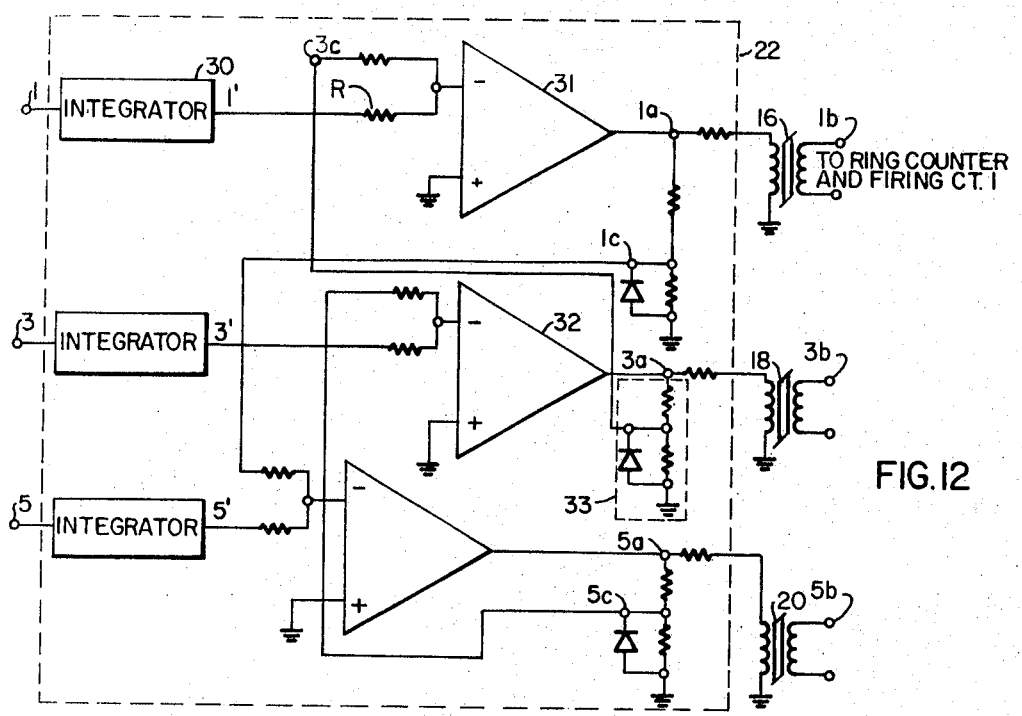
FIG. 12 is a more detailed circuit schematic of an end stop pulse generator circuit in accordance with this invention.
Figure 13:
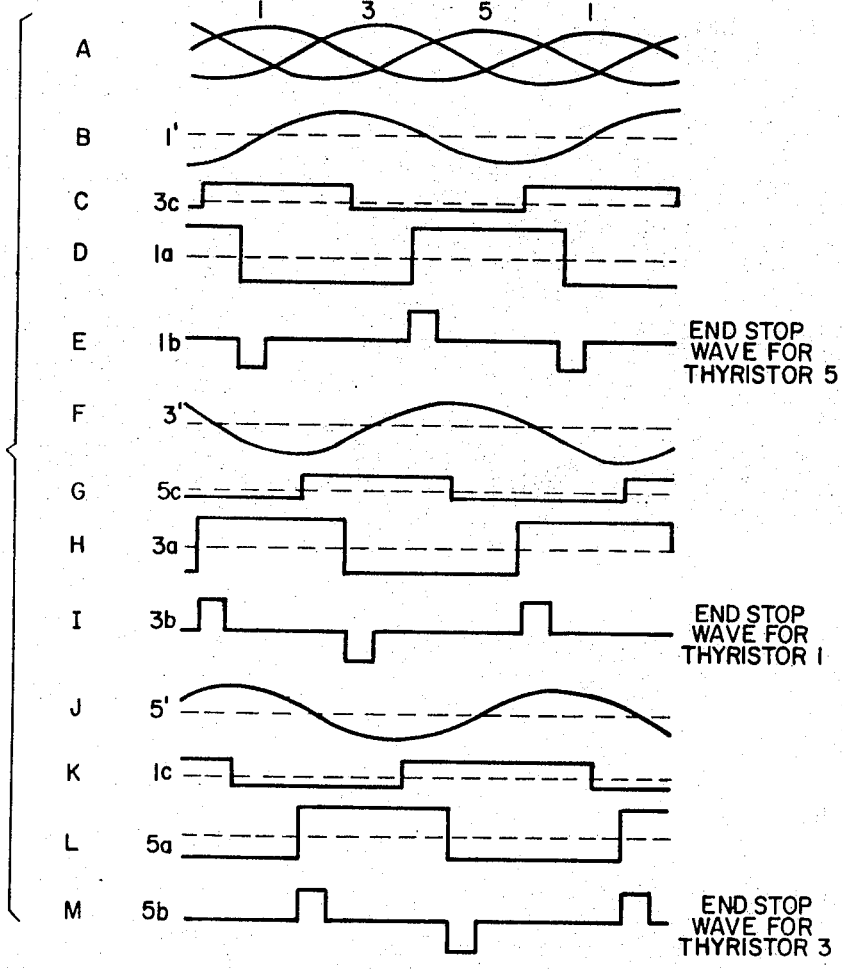
FIG. 13 is a set of waveforms illustrating the operation of the circuit of FIG. 12.

FIG. 12 shows a circuit schematic of a preferred embodiment of the end stop pulse source 22 of FIG. 10. This is a three pulse system which includes three identical circuits, one for each end stop waveform, with interconnections between the circuits for coordinating their operation. The operation of the system can be explained by considering the operation of one of the three channels. A portion of the cycloconverter AC input line to neutral voltage waveform is connected to the input of an integrator 30, the output of which is a negative cosine wave. The waveforms are illustrated in FIG. 13. Waveform A shows the three inputs to points 1, 3 and 5. Waveforms B, F and J are, respectively, the integrator outputs. The integrator output wave is connected through a resistor R to the input of a null detector 31, the function of which is to produce a steady positive voltage at its output whenever its input voltage is negative and vice versa (waveform D). Thus with zero voltage at point 3c the output of the null detector 31 would be a symmetrical square wave in exact phase opposition with the output of the integrator 30 and the end stop voltage waveform at the output of the saturating transformer 16 would consist of evenly spaced positive and negative pulses, the width of which is determined by the volt-second capability of the saturating transformer 16. In practice, the edges of this hypothetical symmetrical end stop waveform would not occur at precisely the required points and it is necessary to produce some asymmetry into this waveform so that the trailing edge of the positive pulse and the leading edge of the negative pulse each occur precisely at the correct points. This is achieved by means of connecting a small asymmetrical rectangular correction signal at point 3C into the null detector. This signal is obtained from the output of the null detector 32 in the middle channel through the resistor-diode circuit shown at 33. By suitable design of these resistor-diode circuits so as to produce a prescribed amount of bias voltage, it is possible to position the end stop waveform in each output channel at precisely the required points. From the foregoing, it can be seen that the other channels of FIG. 12 similarly operate in phase displaced relationship.

We claim:
1. Converter apparatus comprising;
an input voltage source;
a reference voltage source;
switching means interconnected with said sources; and
means for generating and applying firing pulses to said switching means to produce from said switching means an output voltage having the waveform of said reference voltage substantially at the power level of the input voltage;
said firing pulse means being of the type in which firing points are determined as a function of the integrals of the converter output waveform and the reference voltage waveform; and
firing pulse end stop control means for insuring proper operation even when said reference voltage is out of a predetermined operative range, said end stop means comprising means to generate periodic firing pulses independently of the reference voltage and to apply said pulses to said switching means;
said firing pulse means comprising a comparator having inputs representative of integrated signals developed from the converter output waveform and the reference voltage waveform, and said firing pulse end stop control means comprising means for supplying signals to said comparator independently of said reference voltage waveform to generate firing pulses when said reference voltage is outside of a predetermined operative range.

2. The subject matter of claim 1 wherein:
said end stop control means comprises, for each of a plurality of switching elements of said switching means, a transformer having a secondary winding serially connected in circuit with the firing pulse means for said switching means and means connected to the primary of each of said transformers for applying thereto signals resulting in the saturation of said transformers on a periodic phase displaced basis to induce a sequence of positive going and negative going pulses alternately in the secondaries thereof that are supplied to said comparator of said firing pulse means.

3. The subject matter of claim 2 wherein:
said end stop control means further comprises an integrator for each switching element channel to which is applied the converter power waveform and which produces a cosine wave thereof which is applied through resistive impedance means to a null detector along with another signal representative of the condition of another one of the end stop control means of another channel with the output of the null detector supplied to the primary winding of the respective transformer.

4. A converter circuit, wherein the phase, frequency and amplitude of an output is controlled as a function of a reference waveform, comprising: switching means responsive to a firing pulse to control the output waveform of the converter; an intergrating control circuit for responding upon occurrence of a predetermined relationship between the average value of the reference waveform and the average value of the converter output waveform to initiate a firing pulse; and an end stop firing pulse control circuit supplying signals, developed independently of said reference voltage, to said intergrating control circuit to develop firing pulses upon occurrence of a predetermined relationship between said signals from said firing pulse control circuit and other inputs to said integrating control circuit;

said integrating control circuit including a comparator having two inputs representative of integrated signals developed from the converter output waveform and the reference voltage waveform and said signals from said end stop firing pulse control circuit are also applied to said comparator.

5. The subject matter of claim 4 wherein:

at least said integrating control circuit includes at least one amplifier element subject to saturation upon transient excursions of the reference voltage and said end stop firing pulse control circuit insures generation of firing pulses even while the reference voltage is undergoing a transient excursion.

* * * * *